Patented Feb. 16, 1943

2,311,260

UNITED STATES PATENT OFFICE 2,311,260

ESTERS OF ENDO-METHYLENE HYDROPHTHALIC ACIDS WITH GLYCOL AND POLYGLYCOL MONOETHERS

Charles E. Staff, Charleston, W. Va., assignor to Carbide and Carbon Chemicals Corporation, a corporation of New York No Drawing. Application October 18, 1941, Serial No. 415,632

9 Claims. (Cl. 260—468)

This application is a continuation-in-part of the copending application of C. E. Staff and W. N. Stoops, entitled "Plastic compositions," Serial No. 339,490, filed June 8, 1940. That application is concerned with plastic compositions consisting of vinyl resins intimately combined with diester plasticizers formed by reacting the acidic adducts of hydrocarbons having conjugated double bonds and maleic acid or anhydride, or their derivatives, with a mono-hydroxyl compound of the group consisting of aliphatic acyclic and cyclic alcohols having at least six carbon atoms, glycol monoethers, and polyglycol monoethers. This invention is concerned with, as new chemical compounds, diesters of those endo-methylene hydrophthalic acids having not more than one double bond with alkylene glycol monoethers, including both monoalkylene and polyalkylene glycol monoethers.

The class of endo-methylene hydrophthalic acids having not more than one double bond is composed of both the tetra- and hexahydro modifications of these acids. The tetrahydro acids may be formed by the addition of cyclopentadiene and maleic anhydride as described in Diels and Alder Patent No. 1,944,731, whereas the endo-methylene hexahydrophthalic acids may be formed by the hydrogenation of these adducts. The saturated esters may also be formed by hydrogenation of the diesters of endo-methylene tetrahydrophthalic acid with the glycol or polyglycol monoethers. Typical glycol or polyglycol monoethers which may be employed in forming the new esters are the methyl, ethyl, propyl, butyl, hexyl, cyclohexyl, phenyl and benzyl monoethers of ethylene, propylene and butylene glycols, or their di-, tri-, tetra-, penta-, or hexa- modifications which may be either the simple or mixed polymers of the monoglycols. The radical forming the monoether group may be any monovalent radical capable of completing an ether linkage, and, as indicated above, it may belong to either the aliphatic or aromatic series. Substituent groups may be present in the monovalent radical of the ether group, and the monochlorethyl ether of ethylene glycol is an example of such a substituted ether.

Esterification of the aforesaid endo-methylene hydrophthalic acids with the foregoing group of glycol and polyglycol monoethers may be carried out at temperatures ranging from 50° to 300° C. and, if desired, in the presence of suitable catalysts, such as sulfuric acid. The water formed during esterification may be removed continuously as an azeotropic mixture by distillation with benzene, xylene, or toluene.

The new esters are valuable for various industrial uses. Thus, they may be used as softeners or modifiers in various waxes and polishes, as softening agents for leather, and as high boiling solvents, lubricants, textile assistants, and penetrants, but they are particularly suited as plasticizers for vinyl resins.

Vinyl resins from which plastic compositions may be derived by combination with the new esters are those which may be formed by the polymerization or condensation of vinyl compounds, such as vinyl acetate, vinyl propionate, vinyl butyrate, vinyl chloride, vinyl bromide, or vinyl benzene (styrene). Polyvinyl acetal resins, which may be formed by the partial or complete reaction of aldehydes with polyvinyl alcohol or incompletely hydrolyzed polyvinyl esters, are also included within the group of vinyl resins. A particularly desirable type of vinyl resin for use in the plastic compositions is that which may be formed by the conjoint polymerization of vinyl halides with vinyl esters of aliphatic acids.

The plastic compositions are valuable for various applications and, depending on the use involved, the selection of vinyl resins with special characteristics is indicated. If the plastic composition is intended for use in lacquers from which it is deposited, upon drying or baking, as a protective, ornamental or electrically insulating coating in the form of a flexible and tough film, the following vinyl resins are preferred:

a. Polyvinyl acetal resins formed by the condensation of aldehydes with polyvinyl alcohol.
b. Conjoint polymers of vinyl chloride with vinyl acetate, having an average macromolecular weight of from 8,000 to 12,000, and having a vinyl chloride content of from 80% to 90% by weight.

If colloidal, homogeneous solid dispersions of the vinyl resins and the plasticizers are to be prepared, the use of highly polymerized, insoluble polyvinyl halides, or of conjoint polymers of vinyl chloride with vinyl acetate having average macromolecular weights in excess of 12,000, and having vinyl chloride contents ranging from 85% to 95% by weight is desirable. Such dispersions are strong and resilient and provide highly serviceable substitutes for leather or for rubber, and their durable characteristics qualify them for use in cable insulation. Such dispersions may be prepared by working an amount of the plasticizer from about 20% to about 50% by weight of the plastic composition with the resins on a heated rubber mill until a homogeneous colloidal dispersion is obtained.

As contrasted with known plasticizers, such as the lower aliphatic esters of derivatives of tetrahydrophthalic acid, the new esters, when incorporated in plastic compositions of the type just described, provide the advantages of greater strength at elevated temperatures and of greater flexibility at extremely low temperatures of around −15° C.

EXAMPLE 1.—*Di(ethoxyethyl) endo-methylene tetrahydrophthalate*

This ester was prepared by heating 250 grams of endo-methylene tetrahydrophthalate anhydride with 500 grams of ethylene glycol monoethyl ether in the presence of 1 gram of toluene sulfonic acid as a catalyst and of 200 cc. of benzene. The water formed in the reaction was removed as an azeotropic distillate with the benzene. The ester was recovered as a water-white liquid having a boiling point of 196° C. at 7 mm. and it possesses merit as a plasticizer for the vinyl resins.

EXAMPLE 2.—*Di(methoxyethyl) endo-methylene tetrahydrophthalate*

This ester was prepared as described above by heating 250 grams of endo-methylene tetrahydrophthalic anhydride with 400 grams of ethylene glycol monomethyl ether in the presence of 1 gram of toluene sulfonic acid and 200 cc. of benzene. The new compound was a water-white liquid having a boiling point of 164° C. at 3 mm.

EXAMPLE 3.—*Di(ethoxyetheneoxyethyl) endo-methylene tetrahydrophthalate*

This compound was prepared as a dark yellow liquid by heating 200 grams of endo-methylene tetrahydrophthalic anhydride with 400 grams of diethylene glycol monoethyl ether in the presence of 1 gram of toluene sulfonic acid and 50 cc. of benzene.

EXAMPLE 4.—*Di(phenoxyethyl) endo-methylene hexahydrophthalate*

This saturated ester was prepared by heating 290 grams of ethylene glycol monophenyl ether with 166 grams of endo-methylene hexahydrophthalic anhydride in the presence of 0.9 gram of sulfuric acid and 200 cc. of toluene. The reaction was conducted over a period of 7 hours and at a temperature of 134° to 152° C. The product was a light brown, very viscous liquid having a saponification equivalent of 206 which corresponds closely to the theoretical value of 203.

EXAMPLE 5.—*Di(chlorethoxyethyl) endo-methylene tetrahydrophthalate*

This ester was prepared by heating 164 grams of endo-methylene tetrahydrophthalic anhydride with 249 grams of diethylene glycol chlorhydrin in the presence of 0.8 gram of sulfuric acid and 200 cc. of toluene. The reaction time was 3 hours and the reaction temperature was 160° C. The product was recovered as a pale yellow liquid having a boiling point of 230° to 235° C. at 6 mm. and a saponification equivalent to 99.3 corresponding closely to the theoretical value of 98.8. It was found to be insoluble in water, gasoline and mineral oil, and it possessed a specific gravity of 1.275 at 20°/20° C.

It is understood that the term "alkylene glycol" as employed in this specification and in the appended claims includes both monoalkylene and polyalkylene glycols.

I claim:

1. As new chemical compounds, alkylene glycol monoether diesters of endo-methylene hydrophthalic acids, said acids having not more than one double bond.

2. As new chemical compounds, diesters of endo-methylene tetrahydrophthalic acid with an alkylene glycol monoether.

3. As new chemical compounds, diesters of endo-methylene hexahydrophthalic acid with an alkylene glycol monoether.

4. As new chemical compounds, monoalkylene glycol monoalkyl ether diesters of endo-methylene hydrophthalic acids, said acids having not more than one double bond.

5. Di(ethoxyethyl) endo-methylene tetrahydrophthalate.

6. As new chemical compounds, polyalkylene glycol monoalkyl ether diesters of endo-methylene hydrophthalic acids, said acids having not more than one double bond.

7. Di(ethoxyetheneoxyethyl) endo-methylene tetrahydrophthalate.

8. As new chemical compounds, monoalkylene glycol monoaryl diesters of endo-methylene hydrophthalic acids, said acids having not more than one double bond.

9. Di(phenoxyethyl) endo-methylene hexahydrophthalate.

CHARLES E. STAFF.